United States Patent
Fargo et al.

(10) Patent No.: US 6,300,698 B1
(45) Date of Patent: Oct. 9, 2001

(54) HERMETIC COMPRESSOR AND AN ELECTRICAL CONNECTOR THEREFOR

(75) Inventors: Vincent P. Fargo, St. Charles, MO (US); J. Scott Rose, Alton, IL (US); Kent L. White, Maryland Heights; John H. Hussey, St. Louis, both of MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/425,524

(22) Filed: Oct. 22, 1999

(51) Int. Cl.[7] .................................................. H02K 11/00
(52) U.S. Cl. ................................ 310/71; 310/89; 310/91; 439/45; 439/568; 439/572
(58) Field of Search .................................. 310/71, 89, 91, 310/194, 254; 439/470, 464, 465, 467, 471, 45, 384, 557, 926, 568, 572

(56) References Cited

U.S. PATENT DOCUMENTS

| | | | |
|---|---|---|---|
| 4,296,275 | 10/1981 | Bowsky | 174/152 |
| 4,611,138 | 9/1986 | Kindig et al. | 310/71 |
| 4,642,497 | 2/1987 | Boyd, Jr. | 310/68 |
| 4,685,201 | 8/1987 | Boyd, Jr. | 29/596 |
| 4,998,035 * | 3/1991 | Jensen | 310/91 |
| 5,015,894 * | 5/1991 | Crow et al. | 310/89 |
| 5,057,732 * | 10/1991 | Fukaya | 310/208 |
| 5,073,735 * | 12/1991 | Takagi | 310/71 |
| 5,126,608 * | 6/1992 | Sogabe et al. | 310/71 |
| 5,334,897 * | 8/1994 | Ineson et al. | 310/89 |
| 5,385,453 | 1/1995 | Fogt et al. | 417/410.5 |
| 5,465,016 * | 11/1995 | Mancl et al. | 310/71 |
| 5,588,871 | 12/1996 | Salvaneschi | 439/469 |
| 5,611,674 | 3/1997 | Bass et al. | 417/220 |
| 5,613,841 | 3/1997 | Bass et al. | 417/310 |
| 5,678,985 | 10/1997 | Brooke et al. | 417/299 |
| 5,741,120 | 4/1998 | Bass et al. | 417/44.2 |
| 5,861,689 * | 1/1999 | Snider et al. | 310/71 |
| 5,897,306 | 4/1999 | Beck | 418/55.3 |
| 6,028,383 * | 2/2000 | Ohshita | 310/71 |

\* cited by examiner

*Primary Examiner*—Nestor Ramirez
*Assistant Examiner*—Thanh Lam
(74) *Attorney, Agent, or Firm*—Senniger, Powers, Leavitt & Roedel

(57) ABSTRACT

A hermetic compressor and electrical connector therefor. A shell of the compressor defines an internal chamber and a motor positioned inside the shell within the chamber drives the compressor. The motor has a stator assembly including a winding. A hermetic terminal plug connects the winding to a power supply to energize the motor. The plug has an internal conductor pin electrically connected to a corresponding external conductor pin. The internal conductor pin protrudes into the internal chamber for connection to the winding and the external conductor pin extends away from the shell for connection to the power supply for energizing the motor. The compressor also includes a terminal block mounted on the stator assembly for supporting an end portion of the winding. The terminal block has a notch aligned with the internal conductor pin for receiving the internal conductor pin when the motor is positioned inside the shell. In this manner, the internal conductor pin is electrically connected to the end portion of the winding supported by the terminal block. The invention is also directed to a method of constructing such a compressor.

17 Claims, 4 Drawing Sheets

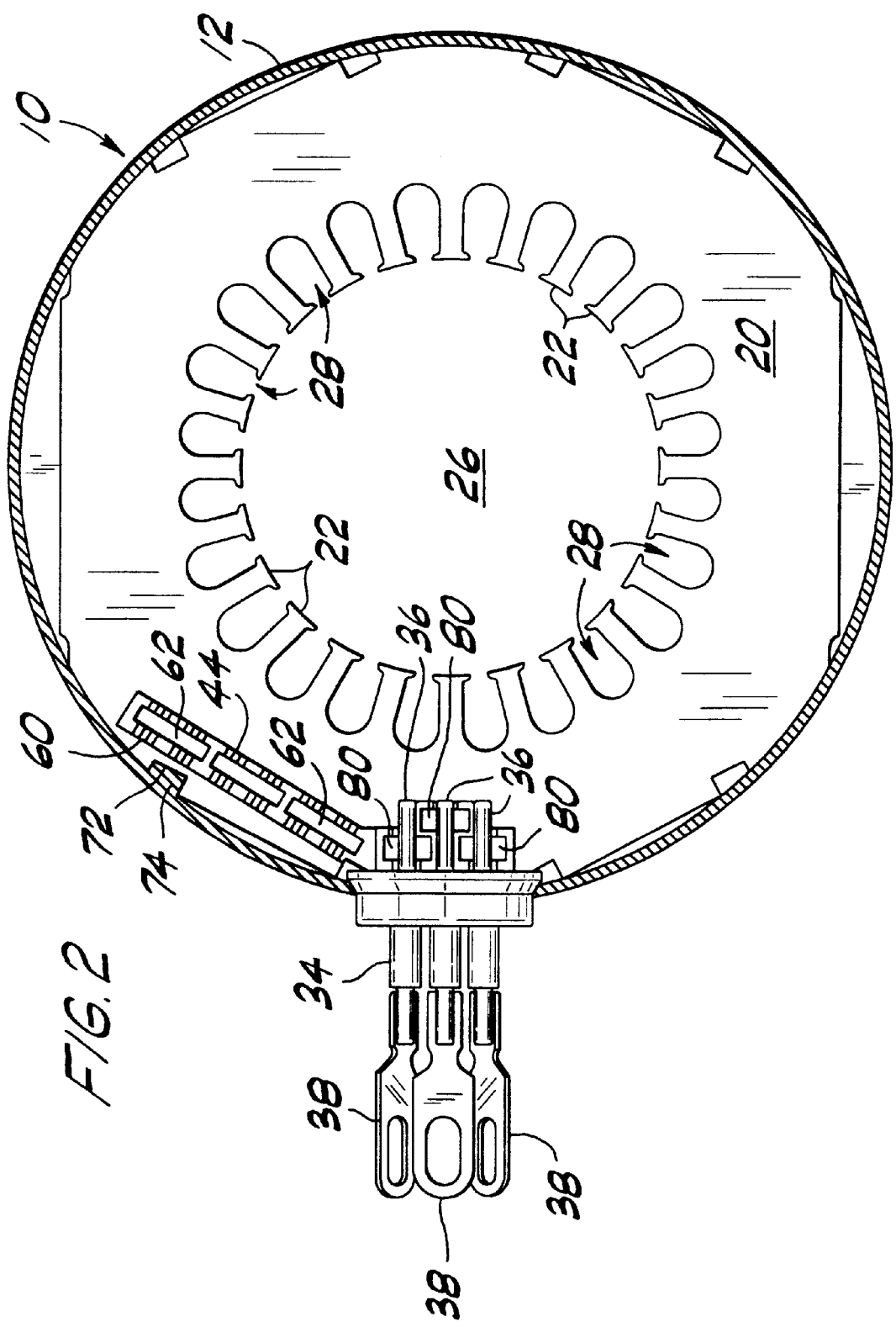

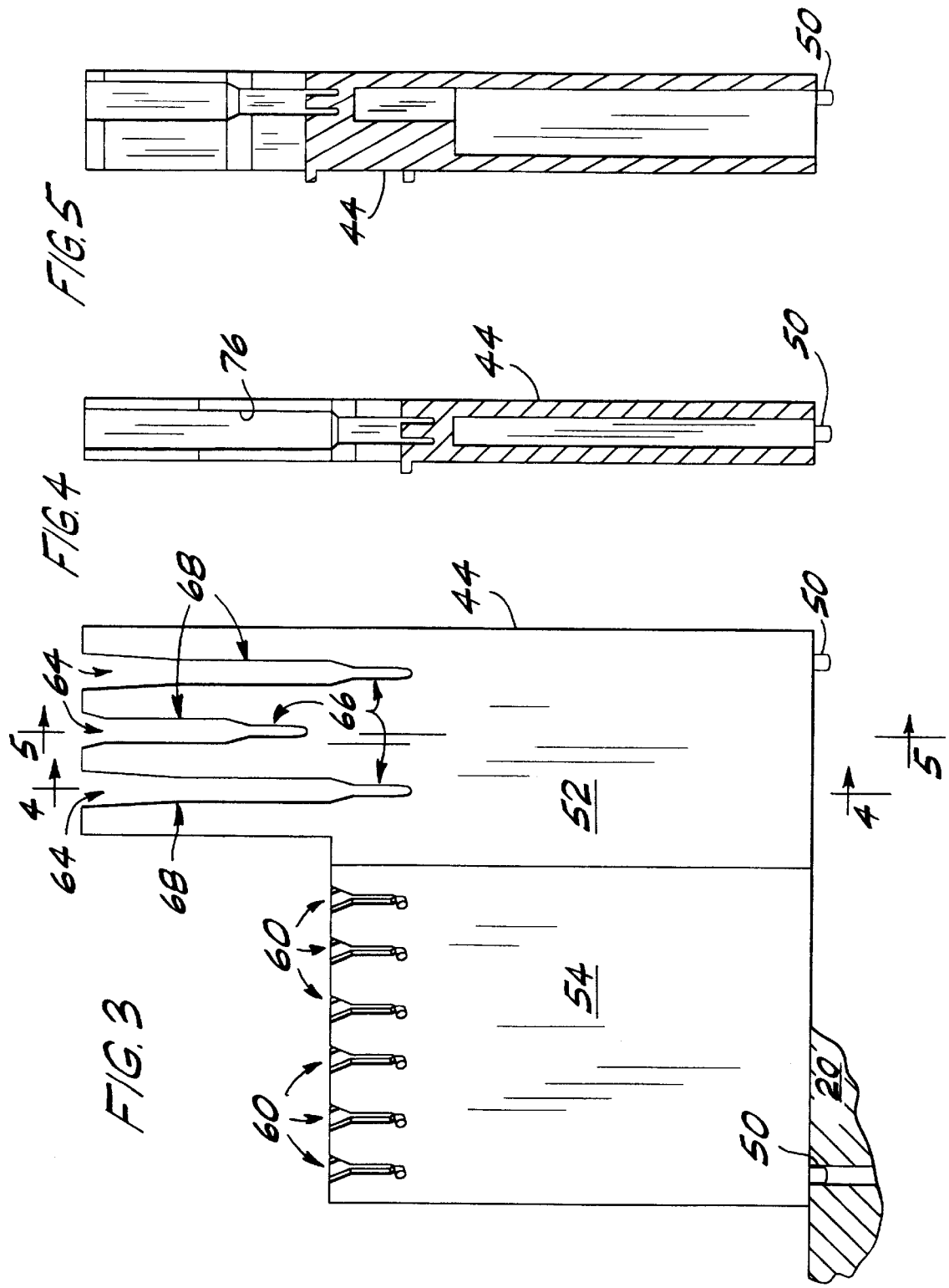

HERMETIC COMPRESSOR AND AN ELECTRICAL CONNECTOR THEREFOR

BACKGROUND OF THE INVENTION

The invention generally relates to hermetic compressors and, particularly, to a compressor having an internal hermetic chamber with a connector block inside the chamber for providing motor power connections without the need for a cluster block and leads arrangement.

A compressor is generally provided with a can-type outer shell or case that defines an internal hermetic chamber. A motor resiliently mounted to the shell inside the chamber drives the compressor. As is well known in the art, the stator of the compressor motor has at least one winding of magnet wire, for example, that is adapted for excitation when the motor is energized. Depending on the desired operating characteristics of the hermetic compressor, the stator winding(s) have various different electrical and physical configurations. A set of conductor leads integral with the windings extend from the stator. In a typical compressor, a connection block or plug extends into the shell for connection with the motor via the leads extending from the stator. The plug also protrudes from the shell for connection with a power source for energizing the motor. The plug has a set of electrical connectors or pins for this purpose. A Fusite® plug, for example, is a hermetically sealed connection block used in conjunction with can-type closures. It is adapted to be welded to the compressor's shell to allow the stator leads inside the shell to be connected to the power leads outside the shell.

In presently available compressors, a cluster block is attached to the ends of the stator leads. An assembler connects the cluster block in circuit relation with the part of the plug inside the shell for connection to the power leads. Unfortunately, it is difficult for the assembler to connect the cluster block to the plug. Often, the assembler must strike the cluster block with a hammer to connect the block to the plug. This can damage the block, leading to cracks or breaks that are only detected after the compressor shell is hermetically sealed.

The cluster block is also susceptible to having the ends of the stator leads pulling out. Moreover, an assembler will often lift the motor by the stator leads and cluster block arrangement causing undue stress on the connections.

For these reasons, directly connecting the stator winding to the plug without leads and a cluster block is desired.

SUMMARY OF THE INVENTION

The invention meets the above needs and overcomes the deficiencies of the prior art by providing an improved connector block for use in a hermetic compressor. Among the several objects and features of the present invention may be noted the provision of a compressor that permits easy connection of its terminal plug and motor windings; the provision of such compressor that provides a durable and rugged connection between its terminal plug and motor windings; the provision of such compressor that permits easy connection of its motor windings; the provision of such compressor that provides a durable and rugged connection of its motor windings; the provision of such compressor that permits directly connecting the motor windings to the plug without leads and a cluster block; and the provision of such compressor that is economically feasible and commercially practical.

Briefly described, a hermetic compressor embodying aspects of the invention includes a shell defining an internal chamber of the compressor and a motor for driving the compressor. The motor is positioned inside the shell within the internal chamber and has a stator assembly including at least one winding. A hermetic terminal plug connects the winding to a power supply to energize the motor. The plug has at least one internal conductor pin electrically connected to at least one corresponding external conductor pin. The internal conductor pin protrudes into the internal chamber for connection to the winding and the external conductor pin extends away from the shell for connection to the power supply for energizing the motor. The compressor also includes a terminal block mounted on the stator assembly for supporting an end portion of the winding to be connected to the internal conductor pin. A first section of the terminal block has a notch aligned with the internal conductor pin for receiving the internal conductor pin when the motor is positioned inside the shell. In this manner, the internal conductor pin is electrically connected to the end portion of the winding supported by the terminal block.

In another embodiment, the invention is directed to a terminal block for use in a hermetic compressor. The compressor has a shell defining an internal chamber and a motor positioned inside the shell within the internal chamber for driving the compressor. The motor has a stator assembly including at least one winding. The compressor also has a hermetic terminal plug for connecting the winding to a power supply to energize the motor. The plug has at least one internal conductor pin electrically connected to at least one corresponding external conductor pin. The internal conductor pin protrudes into the internal chamber for connection to the winding and the external conductor pin extends away from the shell for connection to the power supply for energizing the motor. The terminal block includes an electrically insulative body mounted on the stator assembly for supporting portions of the winding. A first section of the body has a first notch aligned with the internal conductor pin for receiving an end portion of the winding and the internal conductor pin when the motor is positioned inside the shell. This electrically connects the internal conductor pin to the end portion of the winding in the first notch. The terminal block also includes a second section having a second notch for receiving another portion of the winding in an electrically connected relationship.

Another embodiment of the invention is directed to a method of constructing a hermetic compressor. The compressor has a shell defining an internal chamber. When constructed, a motor inside the shell drives the compressor. The motor has a stator assembly including at least one winding. The method includes the step of installing a hermetic terminal plug in a side wall of the shell. The plug connects the winding to a power supply for energizing the motor. The plug has at least one internal conductor pin that protrudes into the internal chamber for connection to the winding and at least one corresponding external conductor pin that extends away from the shell for connection to the power supply for energizing the motor. The internal and external conductor pins are electrically connected to each other. The method also includes mounting a terminal block on a top surface of the stator assembly adjacent an outer edge of the top surface and positioning an end portion of the winding in a notch in the terminal block. The method further includes the steps of aligning the notch with the internal conductor pin and inserting the motor into the shell while maintaining the alignment of the notch with the internal conductor pin. The method further includes mounting the motor in position within the internal chamber so that the notch in the terminal block receives the internal conductor pin. In doing so, the internal conductor pin is electrically connected to the end portion of the winding positioned in the notch.

Alternatively, the invention may comprise various other methods and systems.

Other objects and features will be in part apparent and in part pointed out hereinafter.

BRIEF DESCRIPTION OF THE DRAWINGS

FIG. 2 is a top cross sectional view of the compressor of FIG. 1.

FIG. 3 is an elevational view of a terminal block of the compressor of FIG. 1.

FIG. 4 is a cross sectional view of the terminal block of FIG. 3 taken generally along line 4—4.

FIG. 5 is a cross sectional view of the terminal block of FIG. 3 taken generally along line 5—5.

Corresponding reference characters indicate corresponding parts throughout the drawings.

DETAILED DESCRIPTION OF PREFERRED EMBODIMENTS

Figure 1:
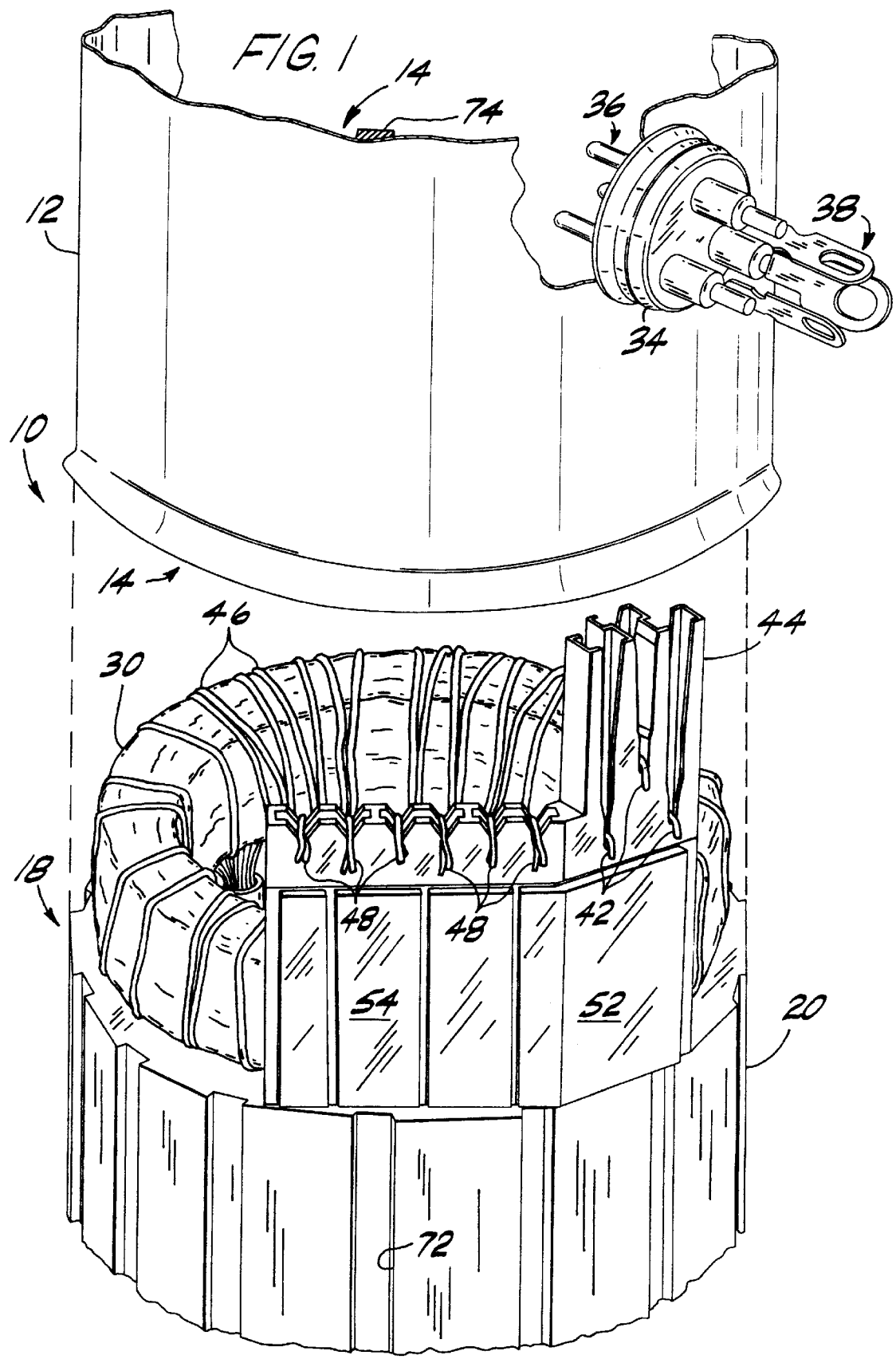
FIG. 1 is an exploded perspective view of a compressor according to a preferred embodiment of the invention.

Referring now to the drawings, FIG. 1 is an exploded, fragmentary view of a hermetic compressor, generally indicated at 10, for use in a refrigeration or air conditioning system or the like. A housing, also referred to as a shell, case or can, 12 defines an internal hermetic chamber 14. As is well known in the art, a motor, generally indicated at 18, is resiliently mounted inside the chamber 14 for driving the compressor 10. Copeland Corporation manufactures a number of compressors of the general type described herein. These compressors are covered by one or more of the following patents: U.S. Pat. Nos. 5,741,120, 5,678,985, 5,613,841 and 5,611,674, the entire disclosures of which are incorporated herein by reference.

The motor 18 includes a stator assembly 20 forming a core of magnetic material. In this embodiment, the core consists of a stack of laminations punched from sheet-like ferro-magnetic material and held together by conventional means. Although not illustrated in FIG. 1, those skilled in the art understand that each lamination has a plurality of teeth 22 (see FIG. 2) spaced around a central opening 26 (see FIG. 2) and extending radially inwardly. When the laminations are stacked and aligned, the central openings 26 are coaxial and constitute a bore extending longitudinally through the core. In a preferred embodiment, the bore receives a rotor assembly (e.g., a squirrel cage rotor) (not shown) made from a stack of rotor laminations. As is well known, the rotor is in magnetic coupling relation with the stator 20.

Each pair of adjacent teeth 22 of stator 20 defines a slot 28 (see FIG. 2) in between teeth 22 for holding coils of wire that define one or more stator windings 30. Depending on the desired operating characteristics of the hermetic compressor 10, the stator windings 30 may have various electrical and physical configurations. In general, windings 30 consist of a plurality of turns of suitable magnet wire or the like. Windings 30 are preferably arranged as coil sets inserted in selected stator slots 28 so that they are generally on opposite sides of the stator bore from one another. When windings 30 are energized, stator 20 creates a magnetic field in contrast to a magnetic field created by current induced in the rotor. These contrasting rotating magnetic fields cause rotating torque of the rotor. In this instance, the rotor has a bore for receiving a hermetic compressor crankshaft that rotatably supports the rotor body within the stator bore and drives compressor 10.

In the present embodiment, a connection block or plug 34 extends into the hermetic chamber 14 defined by shell 12 for connecting motor 18 to a power supply (not shown) located outside the shell 12. The plug 34 has two sets of corresponding electrical connectors or pins 36, 38, for this purpose. For example, Emerson Electric Company's Fusite® plug is a suitable hermetically sealed connection block used in conjunction with can-type closures. It is adapted to be welded to shell 12 to allow motor 18 inside the shell 12 to be connected to power leads outside the shell 12. Commonly assigned U.S. Pat. No. 4,296,275, the entire disclosure of which is incorporated herein by reference, describes a hermetic refrigeration terminal of this type.

In a conventional compressor, a set of conductor leads extend about six inches or so from the stator windings for making the power connections. A cluster block of well known construction and adapted to receive the pins 36 is then attached to the ends of the stator leads. The present invention advantageously eliminates the need for such lengthy conductor leads and cluster block. FIG. 1 illustrates relatively short portions of magnet wire 42 that are integral with windings 30 and by which power is provided for energizing windings 30. Rather than utilizing a cumbersome lead and cluster block arrangement, the present invention employs a cavity block 44 designed specifically for use with plug 34. In a preferred embodiment, the cavity block 44, also referred to as a connector block or terminal block, is made from plastic and affixed to the face of the stator core near the edge of stator assembly 20.

Referring further to FIG. 1, cavity block 44 also simplifies connecting the wires making up windings 30. If the compressor motor 18 has a three phase, parallel wound configuration, for example, the stator windings 30 include twelve wires that are spliced or otherwise connected in six places. In a conventional compressor motor, these connections are made by the fairly laborious process of crimping, brazing, welding or the like and then covered with insulating material. As is well known in the art, a lacing twine 46 and/or another wrapping is used to wrap windings 30. In the conventional compressor motor, the wire connections are also wrapped by the lacing twine 46, making them relatively inaccessible in the event of a faulty connection. According to the present invention, however, cavity block 44 provides a means for quickly and easily making the wire connections external to the stator assembly 20. This simplifies both construction and repair of compressor 10. FIG. 1 illustrates relatively short portions of magnet wire, generally indicated at 48, that are connected together at cavity block 44.

FIGS. 3–5 illustrate cavity block 44 in greater detail. As shown, cavity block 44 provides one or more pins 50 by which it is secured to stator 20. In an exemplary construction, cavity block 44 is molded from an electrically insulative material such as plastic so that the pins 50 are integrally formed with the block 44. The stator laminations are preferably stamped with pin-receiving holes sized to receive the pins 50. In one embodiment, pins 50 are sized so that they form a friction fit with the pin receiving holes. In addition, it is contemplated that the assembler can affix cavity block 44 to the top surface of the stator core with an adhesive in addition to or instead of pins 50. However, the use of pins 50 should improve the stability of the arrangement. Thus, the holes in the top surface of the stator core constitute receptacles for pins 50.

A first section 52 of cavity block 44 is adapted to receive both the magnet wire portions 42 and the pins 36 of plug 34 for making the power connections for motor 18. A second section 54 is adapted to receive magnet wire portions 48 for making the various winding connections. For ease of assembly, at least a portion of cavity block 44 extends above windings 30.

In this embodiment, the assembler lays the portions 48 of the magnet wire pairs into a plurality of notches 60. A plurality of cavities 62 (see FIG. 2) associated with the notches 60 are designed for use with an electrical terminal (e.g., the type sold by AMP Incorporated under the trademark MAG-MATE®). In general, the cavities 62 are rectangular boxes, each with two narrow notches 60 on opposing walls. After winding the coils, the magnet wire portions 48 are manually placed across cavities 62 and into notches 60. A magnet wire interconnect terminal (not shown) well known in the art may be inserted into each cavity 62. The terminals trim excess magnet wire flush with cavity block 44 and retain magnet wire portions 48 in notches 60 in contact with each other. In this manner, the terminal simultaneously terminates two wires of the same approximate size in one terminal for splicing.

With respect to the power connections for motor 18, the assembler positions each magnet wire portion 42 of windings 30 in a corresponding notch 64. Each of the notches 64 preferably includes a lower portion, generally indicated at 66, that is sized so that wire portion 42 forms a friction fit in its corresponding notch 64. In addition, magnet wire portions 42 may be slightly bent to maintain their positions in notches 64. Each notch 64 also corresponds to one of the pins 36 of plug 34. According to the invention, each notch 64 also has an upper portion 68 sized to guide and receive a respective one of the pins 36.

In one embodiment, stator assembly 20 further includes at least one vertically situated, longitudinal channel 72 (see FIG. 1) in its exterior surface for helping align motor 18 for insertion in shell 12. As the assembler installs motor 18 in shell 12, a longitudinal alignment rib 74 (see FIG. 1) on the interior surface of shell 12 slides along the associated channel 72 to help guide the installation of motor 18. Notches 64 preferably line up with pins 36 when the rib 74 is mated with channel 72. As shown in FIG. 3, notches 64 are tapered to provide a wider opening for receiving pins 36 and then guiding them into contact with the wire portions 42 inserted at the bottom of notches 64. Pins 36 contact the wire portions 42 of windings 30 positioned in notches 64 when stator assembly 20 is fully installed inside shell 12 and, thus, eliminate the need for the assembler to make the connections manually. It is to be understood that the assembler could align motor 18 and shell 12 in the assembly process without the use of channel 72 and rib 74 or other mechanical alignment features.

Figure 6:
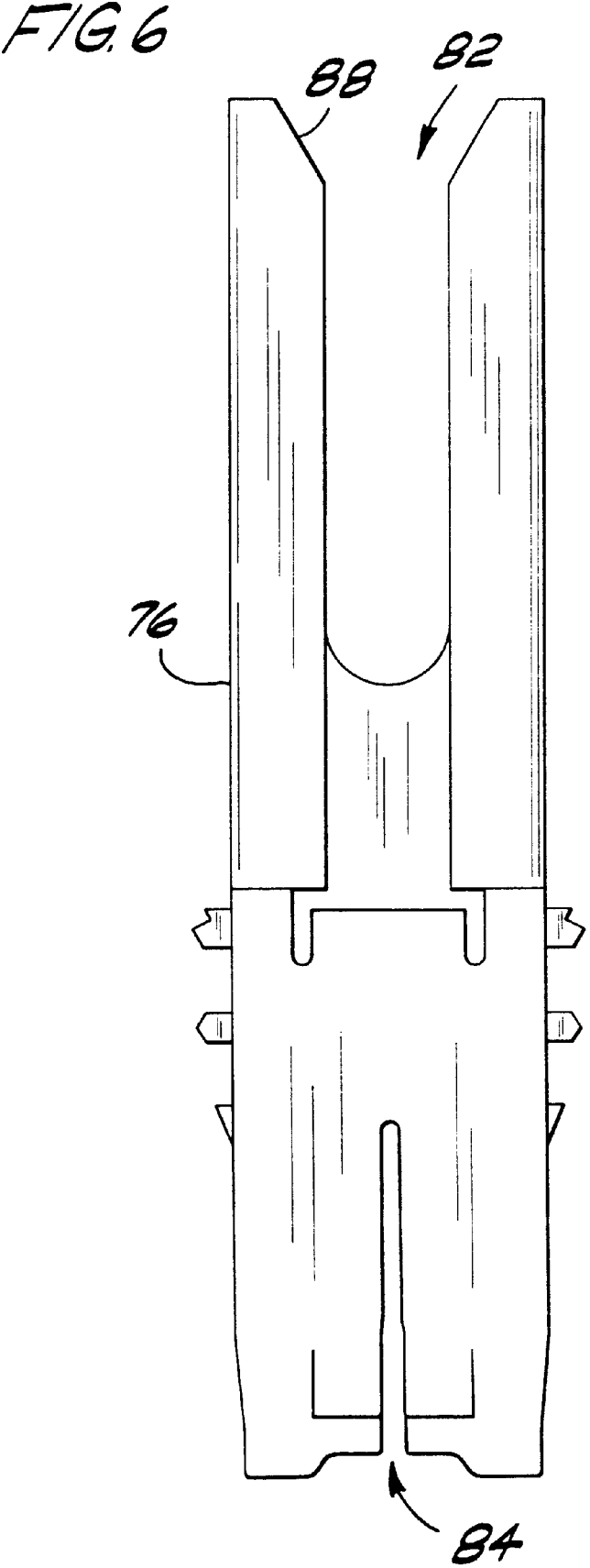
FIG. 6 is a front view of an electrical terminal for use with the terminal block of FIGS. 3–5.

FIG. 6 illustrates an electrical terminal 76 for use with the first section 52 of cavity block 44. The electrical terminal 76 is of the type sold by AMP Incorporated under the trademark MAG-MATE® and provides advantages over conventional terminals. In a preferred embodiment of the invention, the section 52 of cavity block 44 includes a cavity 80 (see FIG. 2) corresponding to each pin 36. As before, the cavities 80 are generally rectangular boxes, each with two narrow notches 64 on opposing walls. After winding the coils, the magnet wire portions 42 are manually placed across cavities 80 and into notches 64. The magnet wire interconnect terminals 76 may then be inserted into corresponding cavities 80.

As shown in FIG. 6, a preferred embodiment of terminal 76 includes an upper notch 82 and a lower notch 84. The upper notch 82 corresponds with the upper portion 68 of notch 64 and has a tapered portion 88 providing a wider opening for receiving the corresponding pin 36 and then guiding it into notch 82. The lower notch 84 corresponds to the lower portion 66 of notch 64 and receives the portion 42 of magnet wire that is positioned at the bottom of notch 64 across cavity 80. When the assembler inserts the terminal 76 into its corresponding cavity 80, the sides of lower notch 84 engage the portion 42 of magnet wire. In this manner, terminal 76 trims the excess magnet wire flush with cavity block 44 and forms an electrical contact between magnet wire portion 42 and terminal 76.

In a preferred embodiment of the invention, the pins 36 of plug 34 engage the sides of the upper notches 82 of terminals 76 when stator assembly 20 is fully seated within shell 12. Thus, pins 36 contact the wire portions 42 of windings 30 positioned in notches 64 via terminals 76.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A hermetic compressor comprising:
    a shell defining an internal chamber of the compressor;
    a motor for driving the compressor, said motor being positioned inside the shell within the internal chamber, said motor having a stator assembly including at least one winding;
    a hermetic terminal plug for connecting the winding to a power supply to energize the motor, said plug having at least one internal conductor pin that protrudes into the internal chamber for connection to the winding and at least one corresponding external conductor pin that extends away from the shell for connection to the power supply for energizing the motor, said internal and external conductor pins being electrically connected to each other; and
    a terminal block mounted on the stator assembly for supporting an end portion of the winding to be connected to the internal conductor pin, said terminal block having a first section including a notch aligned with the internal conductor pin for receiving the internal conductor pin when the motor is positioned inside the shell thereby to electrically connect the internal conductor pin to the end portion of the winding supported by the terminal block.

2. The compressor of claim 1 wherein the notch has a lower portion for receiving the end portion of the winding, said lower portion of the notch being sized so that the terminal block provides a friction fit when the end portion of the winding is positioned in the lower portion of the notch.

3. The compressor of claim 1 wherein the notch has an upper portion for receiving the internal conductor pin when the motor is positioned inside the shell so that the internal conductor pin is electrically connected to the end portion of the winding positioned in the notch.

4. The compressor of claim 3 wherein the terminal block has tapered sides at the upper portion of the notch to define a tapered opening for guiding the internal conductor pin into the notch as the motor is positioned inside the shell.

5. The compressor of claim 1 wherein the shell includes a longitudinal rib on its interior surface and wherein the stator assembly includes a longitudinal channel on its exterior surface, said rib engaging said channel in a mating relationship when the motor is positioned inside the shell.

6. The compressor of claim 5 wherein the rib and channel are located at predefined radial positions so that the notch in the terminal block is aligned with the internal conductor pin when the rib engages the channel as the motor is positioned inside the shell.

7. The compressor of claim 1 wherein the terminal block includes a cavity associated with the notch for receiving an electrical terminal therein, said terminal for terminating the end portion of the winding positioned in the lower portion of the notch and providing an electrically conductive contact between the terminated end portion of the winding and the internal conductor pin when the motor is positioned inside the shell.

8. The compressor of claim 1 wherein the terminal block includes at least one stabilizing pin extending from its bottom surface and the stator assembly includes at least one receptacle in its top surface for receiving the stabilizing pin in a mating relationship when the terminal block is mounted on the stator assembly.

9. The compressor of claim 1 wherein the terminal block has a second section including at least one notch for receiving at least two portions of the winding and including a cavity associated with the notch in the second section of the terminal block for receiving an electrical terminal, said terminal for terminating the portions of the winding positioned in the notch in the second section of the terminal block and electrically connecting the terminated portions of the winding to each other.

10. The compressor of claim 9 wherein the terminal block has a height greater than that of the winding relative to a top surface of the stator assembly and wherein the notches in the first and second sections of the terminal block are located above the winding relative to the top surface of the stator assembly to facilitate positioning the portions of the winding in the respective notches during assembly of the compressor.

11. A terminal block for use in a hermetic compressor, said compressor having a shell defining an internal chamber thereof and being driven by a motor positioned inside the shell within the internal chamber, said motor having a stator assembly including at least one winding, said compressor further having a hermetic terminal plug for connecting the winding to a power supply to energize the motor, said plug having at least one internal conductor pin that protrudes into the internal chamber for connection to the winding and at least one corresponding external conductor pin that extends away from the shell for connection to the power supply for energizing the motor, said internal and external conductor pins being electrically connected to each other, said terminal block comprising:

an electrically insulative body mounted on the stator assembly for supporting portions of the winding, said body having a height greater than that of the winding relative to a top surface of the stator assembly, said body comprising:

a first section having a first notch aligned with the internal conductor pin for receiving an end portion of the winding and the internal conductor pin when the motor is positioned inside the shell thereby to electrically connect the internal conductor pin to the end portion of the winding in the first notch; and a second section having a second notch for receiving another portion of the winding in an electrically connected relationship.

12. The terminal block of claim 11 wherein the notches in the first and second sections of the body are located above the winding relative to the top surface of the stator assembly to facilitate positioning the portions of the winding in the respective notches during assembly of the compressor.

13. The terminal block of claim 11 wherein the first notch has a lower portion for receiving the end portion of the winding, said lower portion of the first notch being sized so that the body of the terminal block provides a friction fit when the end portion of the winding is positioned in the lower portion of the first notch.

14. The terminal block of claim 11 wherein the first notch has an upper portion for receiving the internal conductor pin when the motor is positioned inside the shell so that the internal conductor pin is electrically connected to the end portion of the winding positioned in the first notch and wherein the body of the terminal block has tapered sides at the upper portion of the first notch to define a tapered opening for guiding the internal conductor pin into the first notch as the motor is positioned inside the shell.

15. The terminal block of claim 11 wherein the first section of the body includes a cavity associated with the first notch for receiving an electrical terminal therein, said terminal for terminating the end portion of the winding positioned in the lower portion of the first notch and providing an electrically conductive contact between the terminated end portion of the winding and the internal conductor pin when the motor is positioned inside the shell.

16. The terminal block of claim 11 wherein the body of the terminal block includes at least one stabilizing pin extending from its bottom surface for engaging a corresponding receptacle in the top surface of the stator assembly when the body is mounted on the stator assembly.

17. The compressor of claim 11 wherein the second section of the body includes a cavity associated with the second notch for receiving an electrical terminal therein, said terminal for terminating the portion of the winding positioned in the second notch.

* * * * *